United States Patent
Burton

(10) Patent No.: US 9,250,338 B2
(45) Date of Patent: Feb. 2, 2016

(54) MULTILAYER JACKET FOR MARINE ACOUSTIC ARRAY APPLICATIONS

(71) Applicant: Teledyne Instruments, Inc., Thousand Oaks, CA (US)

(72) Inventor: Richard D. Burton, Missouri City, TX (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 319 days.

(21) Appl. No.: 13/898,172

(22) Filed: May 20, 2013

(65) Prior Publication Data

US 2014/0340984 A1 Nov. 20, 2014

(51) Int. Cl.

| | |
|---|---|
| *G01V 1/00* | (2006.01) |
| *G01V 1/20* | (2006.01) |
| *G01V 1/38* | (2006.01) |
| *G01V 13/00* | (2006.01) |
| *B29C 47/06* | (2006.01) |
| *B29C 47/00* | (2006.01) |
| *B29C 47/02* | (2006.01) |
| *G01D 11/24* | (2006.01) |

(52) U.S. Cl.
CPC ............ *G01V 1/201* (2013.01); *B29C 47/0023* (2013.01); *B29C 47/0064* (2013.01); *B29C 47/023* (2013.01); *B29C 47/065* (2013.01); *G01D 11/245* (2013.01); *G01V 1/38* (2013.01); *G01V 13/00* (2013.01)

(58) Field of Classification Search
CPC .......... G01V 1/201; G01V 1/38; G01V 13/00
USPC ........................................................... 367/20
See application file for complete search history.

(56) References Cited

U.S. PATENT DOCUMENTS

| | | | | |
|---|---|---|---|---|
| 3,480,967 | A | * 12/1969 | Hanford et al. | ...... 2/68 |
| 3,744,061 | A | * 7/1973 | Frost | ...... 623/22.11 |
| 3,786,409 | A | 1/1974 | Sorkin | |
| 3,787,844 | A | 1/1974 | Hastings et al. | |
| 4,458,362 | A | 7/1984 | Berkovitz et al. | |
| 4,726,315 | A | 2/1988 | Bell et al. | |
| 4,781,140 | A | 11/1988 | Bell et al. | |
| 4,821,241 | A | 4/1989 | Berglund | |
| 4,908,801 | A | 3/1990 | Bell et al. | |
| 4,926,397 | A | 5/1990 | Robertson | |
| 5,052,222 | A | 10/1991 | Stoepfel | |

(Continued)

FOREIGN PATENT DOCUMENTS

| | | |
|---|---|---|
| EP | 0478422 A1 | 4/1992 |
| EP | 0560674 A2 | 9/1993 |

(Continued)

OTHER PUBLICATIONS

Search Report and Combined Search/Examination Report of the International Searching Authority of Great Britain for Application No. GB 1405694.9 dated Aug. 29, 2014.

(Continued)

*Primary Examiner* — Mark Hellner
(74) *Attorney, Agent, or Firm* — K&L Gates LLP

(57) ABSTRACT

In various embodiments, a multilayer jacket for a seismic streamer is disclosed. The multilayer jacket comprises an outer layer comprising a water-resistant and wear-resistant material. The multilayer jacket further comprises an inner layer comprising a hydrocarbon impermeable material.

19 Claims, 5 Drawing Sheets

(56) References Cited

U.S. PATENT DOCUMENTS

| | | |
|---|---|---|
| 5,136,549 A | 8/1992 | Berglund |
| 5,601,046 A | 2/1997 | Berglund |
| 5,943,293 A | 8/1999 | Luscombe et al. |
| 6,108,267 A | 8/2000 | Pearce |
| 6,239,363 B1 | 5/2001 | Wooters |
| 6,477,111 B1 | 11/2002 | Lunde et al. |
| 6,879,546 B2 | 4/2005 | Halvorsen et al. |
| 7,007,555 B2 | 3/2006 | Strong et al. |
| 7,142,481 B1 | 11/2006 | Metzbower et al. |
| 7,230,878 B2 | 6/2007 | Howlid et al. |
| 7,317,660 B2 | 1/2008 | Brumley et al. |
| 7,362,653 B2 | 4/2008 | Green et al. |
| 7,379,387 B2 | 5/2008 | Strong et al. |
| 7,539,082 B2 | 5/2009 | Vogt |
| 7,542,374 B2 | 6/2009 | Brumley et al. |
| 7,545,705 B2 | 6/2009 | Brumley et al. |
| 7,573,781 B2 | 8/2009 | Fernihough et al. |
| 7,710,819 B2 | 5/2010 | Fernihough et al. |
| 7,768,874 B2 | 8/2010 | Strong et al. |
| 7,835,222 B2 * | 11/2010 | Lobe et al. .................. 367/20 |
| 7,839,720 B2 | 11/2010 | Brumley et al. |
| 7,847,925 B2 | 12/2010 | Vogt |
| 8,000,167 B2 | 8/2011 | Fernihough et al. |
| 8,254,208 B2 | 8/2012 | Vogt |
| 8,385,152 B2 | 2/2013 | Brumley |
| 2004/0017731 A1* | 1/2004 | Halvorsen et al. ............ 367/166 |
| 2012/0176859 A1 | 7/2012 | Pabon et al. |
| 2012/0243370 A1* | 9/2012 | Vignaux .................... 367/20 |
| 2012/0243375 A1 | 9/2012 | Melvin, II et al. |

FOREIGN PATENT DOCUMENTS

| | | |
|---|---|---|
| GB | 2338556 A | 12/1999 |
| GB | 2487283 A | 7/2012 |
| WO | WO 87/03379 A1 | 6/1987 |
| WO | WO 2006/005045 A2 | 1/2006 |

OTHER PUBLICATIONS

Examination Report of the Intellectual Property Office of Great Britain for Application No. GB 1405694.9 dated Jul. 10, 2015.

* cited by examiner

MULTILAYER JACKET FOR MARINE ACOUSTIC ARRAY APPLICATIONS

BACKGROUND

Streamer cables are used in a variety of applications, for example, remote sensing in aquatic environments, such as freshwater or saltwater environments. The cables may be used for seismic exploration surveys to gather information about subsurface geology, including oil and gas reserves. The cables may also be used in other applications, such as, for example, underwater mapping or surveillance. The streamer cables usually contain one or more sensors for receiving signals present in the water. Individual streamer cables are often made up of a series of sections, with each section being up to one mile in length. In deployment, streamer cables, or arrays of several streamer cables, may be towed behind a vessel or deposited in a fixed location, such as, for example, in ocean floor deployments.

For towed applications, maintaining proper orientation of the streamer cable and/or streamer cable array can be difficult. For example, the streamer cables must maintain a parallel orientation to the sea floor for seismic exploration. Streamer cables may be filled with a material to cause the streamer cable to be neutrally buoyant in an aquatic environment. For example, in some embodiments, the streamer cables may be filled with a hydrocarbon-based fluid and/or solid to cause the steamer cable to be neutrally buoyant. Hydrocarbons may diffuse from traditional single-layer jackets, causing the streamer cable to lose neutral buoyancy.

SUMMARY

In various embodiments, a multilayer jacket for a seismic streamer is disclosed. The multilayer jacket comprises an outer layer comprising a water-resistant and wear-resistant material. The multilayer jacket further comprises an inner layer comprising a hydrocarbon impermeable material.

In various embodiments, a seismic streamer is disclosed. The seismic streamer comprises a multilayer jacket comprising a water-resistant and wear resistant material. The seismic streamer further comprises a hydrocarbon impermeable material deposited on the inner surface of the multilayer jacket. A low density hydrocarbon void-filling material may be located within the inner layer.

In various embodiments, a method of generating a multilayer jacket for a seismic streamer is disclosed. The method comprises extruding an inner layer comprising a hydrocarbon impermeable material. An outer layer comprising a water-resistant and wear-resistant material is coextruded with the inner layer. The inner layer is filled with a low-density hydrocarbon void-filling material.

FIGURES

The features of the various embodiments are set forth with particularity in the appended claims. The various embodiments, however, both as to organization and methods of operation, together with advantages thereof, may best be understood by reference to the following description, taken in conjunction with the accompanying drawings as follows:

DESCRIPTION

Reference will now be made in detail to several embodiments, including embodiments showing example implementations of a multilayer jacket for a streamer cable. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

Figure 1:
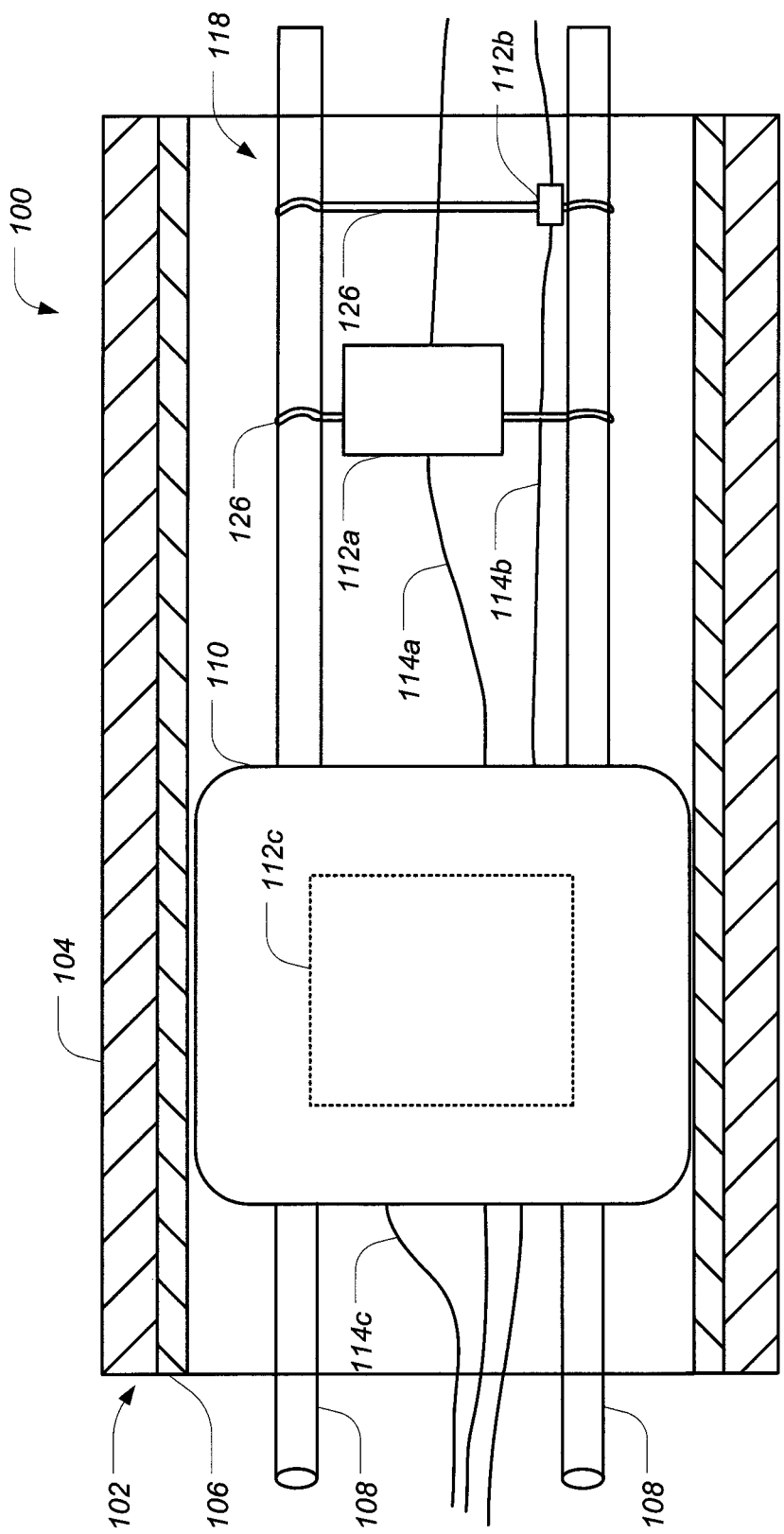
FIG. 1 illustrates one embodiment of a cross-sectional diagram of a section of streamer cable comprising a multilayer jacket.

FIG. 1 illustrates one embodiment of a cross-sectional diagram of a section of streamer cable 100. A multilayer jacket 102 may enclose the streamer cable 100 and surround one or more sensors 112a-112c and/or other internal components as discussed below. The multilayer jacket 102 may comprise two or more layers. For example, in the illustrated embodiment, the multilayer jacket 102 comprises an outer layer 104 and an inner layer 106. The outer layer 104 may comprise a water-resistant and wear-resistant material. The outer layer 104 may be configured to resist wear from repeat exposure to water, such as, for example, salt-water, and wear from deployment, retrieval, and storage over the life of the streamer cable 100. One or more strength members 108 may be disposed within the multilayer jacket 102 to provide the streamer cable 100 with strength as well as secure components at locations within the streamer cable 100. In some embodiments, strength members 108 may comprise, for example, cables made of fiber, synthetic materials, wires, or other suitable materials.

One or more sensors 112a-112c may be disposed within an inner cavity 118 of the multilayer jacket 102. The sensors 112a-112c may include various kinds of transducers and/or other instruments for measuring signals incident on the streamer cable 100. For example, in various embodiments, one or more of the sensors 112a-112c may comprise a hydrophone for sensing acoustic signals. Other types of sensors 112a-112c may also be used including, for example, directional sensors, magnetic sensors, temperature sensors, pressure sensors, or any other suitable sensor type. The sensors 112a-112c may transmit received signal information according to various transmission methods including, for example, electrical methods, optical methods, and/or combinations thereof. One or more wires 114a-114c may transmit the received signal information and may be, for example, electrical signal wires, fiber optic cables, or any other suitable wire for transmitting a signal from the sensors 112a-112c.

The sensors 112a-112c may be secured within the streamer cable 100 for example, by mounting mechanisms 126 and/or bulkheads 110, and may be positioned at any practical interval, position, or orientation within the multilayer jacket 102 of the streamer cable 100. Mounting mechanisms 126 may be made of wire, cable, and/or any other suitable material and may secure the one or more sensors 112a, 112b to strength members 108 using, for example, tie-wraps. In some embodiments, a mounting mechanism may include a sleeve (not shown) for enclosing one or more sensors 112a, 112b, and may be made of various materials including, for example, plasticized PVC, nylon, and/or any other suitable materials.

Figure 2:
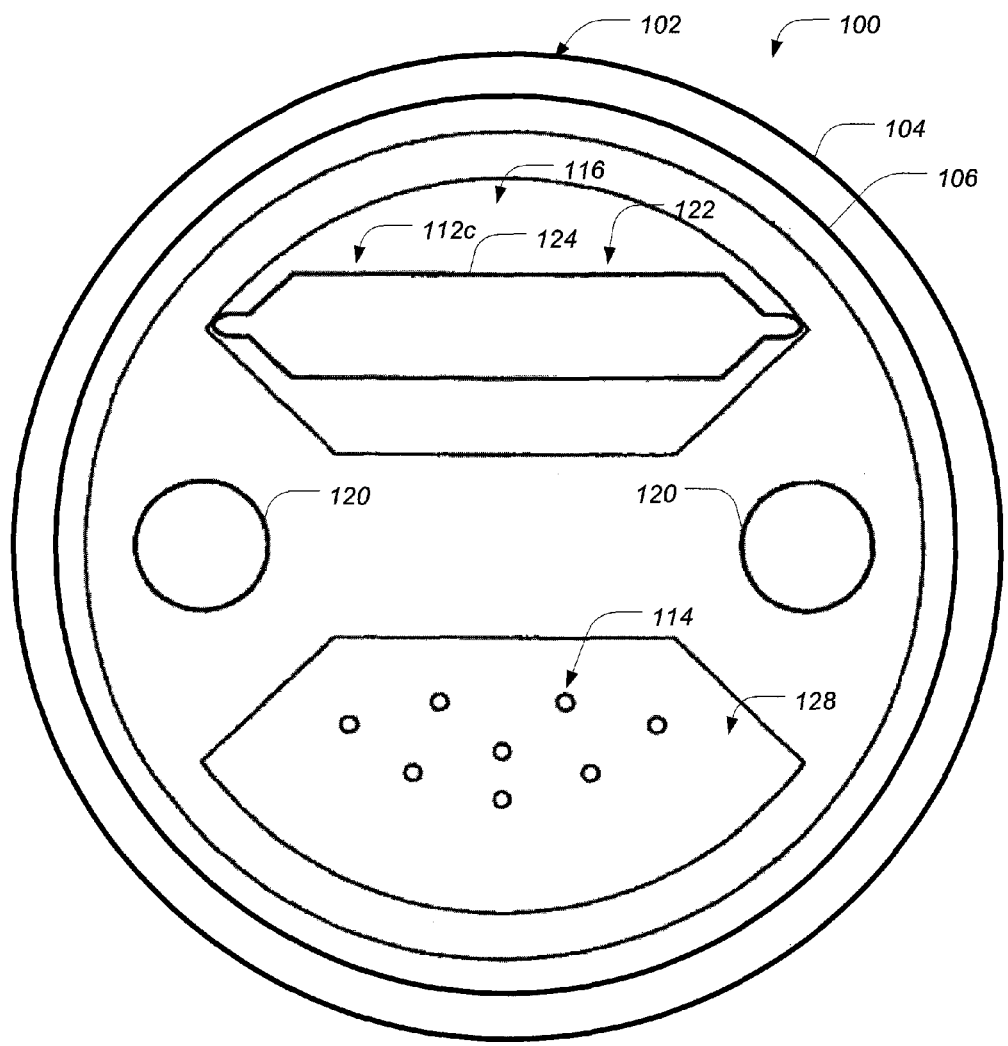
FIG. 2 illustrates one embodiment of a bulkhead.

FIG. 2 illustrates one embodiment of a bulkhead 110. The bulkhead 110 may be made of any suitable material including, for example, plastic. One or more cavities 120 in the bulkhead 110 may be used to secure the bulkhead 110 to the strength members 108 of the streamer cable 100. A wire cavity 128 may contain the plurality of wires 114a-114c. A sensor cavity 122 may house one or more sensors, such as, for example, a hydrophone 112c. The hydrophone 112c may comprise one or more active surfaces 124. The one or more active surfaces 124 may comprise a portion or portions of the hydrophone 112c that are sensitive to signals. In various embodiments, cavity spaces within the bulkhead 110 that are not otherwise filled may include a void-filler material. Various embodiments of streamer cables are described in more detail in U.S. Pat. No. 8,000,167, issued on Aug. 16, 2011, entitled "Streamer Cable With Enhanced Properties," the disclosure of which is hereby incorporated by reference in its entirety.

Referring now to FIGS. 1 and 2, in some embodiments, the inner cavity 118 of the multilayer jacket 102 may be filled with a void-filler material 116. The void-filler material 116 may comprise, for example, a low-density hydrocarbon-based void filling material. For example, in some embodiments, the low-density hydrocarbon-based void filling material may comprise a low-density hydrocarbon fluid, a low-density, liquid hydrocarbon-based solid, and/or any combination thereof. The void-filler material 116 may be configured to provide neutral buoyancy to the streamer cable 100 when the streamer cable 100 is deployed in an aquatic environment and to provide coupling between the sensors 112a-112c and the multilayer jacket 102. For example, the void-filler material 116 may be selected to provide neutral buoyancy to the streamer cable 100 when the streamer cable 100 is deployed in an aquatic environment, such as, for example, a salt-water body. The buoyancy of the streamer cable 100 may be adjusted by selecting a void-filler material 116 comprising a material having a lower density than the aquatic environment in which the streamer cable 100 is to be deployed. For example, a low-density hydrocarbon-based void filling material has a lower density than water and may be used to provide neutral buoyancy to the streamer cable 100 deployed in aquatic environments, such as, for example, salt-water bodies.

The inner layer 106 may comprise a hydrocarbon-impermeable material to prevent the diffusion of hydrocarbons from the void-filling material 116 into the surrounding environment. For example, the streamer cable 100 may be stored for a period of time, such as, for example, one year, prior to use. During storage, the streamer cable 100 may be exposed to changing environmental conditions, such as, for example, extreme temperatures, humidity, weather, or other environmental conditions. In single-layer jacket streamer cables, the changing conditions result in the loss of hydrocarbons to the environment and therefore a loss of neutral buoyancy when the streamer cable is deployed. In some embodiments, the multilayer jacket 102 may comprise an inner layer 106 configured to prevent the loss of hydrocarbons to the surrounding environments. The inner layer 106 may be manufactured from a material that exhibits resistance and/or impermeability to the permeation of hydrocarbons through the material. In some embodiments, the material may be selected to possess sufficient flexibility to allow normal operation of the seismic streamer 100. The inner layer 106 may be coextruded with the outer layer 104 or may be bonded to the outer layer 104, for example, through the use of a bonding layer and/or one or more intermediate layers (not shown).

In some embodiments, the outer layer 104 may comprise a wear-resistant and water-resistant material. For example, the outer layer 104 may comprise a polyether polyurethane material. The polyether polyurethane material may be selected to be water-resistant and wear-resistant over the operational life of the streamer cable 100. Other suitable materials may comprise, for example, plasticized polyvinyl chloride, polyether block amide, thermoplastic polyolefin, Styrene butadiene styrene block copolymers, styrene ethylene-propylene styrene block copolymers, styrene ethylene-butylene styrene block copolymers, polyisoprene, Styrene-butadiene copolymers, styrene-acrylonitrile copolymers, isobutylene-isoprene copolymers, and halogenated isobutylene-isoprene copolymers, polychloroprene, polybutadiene, acrylonitrile-butadiene copolymers, hydrogenated acrylonitrile-butadiene copolymers, block and random copolymers of ethylene and propylene, and terpolymers with diene monomers, and dynamically vulcanised thermoplastic elastomer blends, to name just a few. Those skilled in the art will recognize that other wear-resistant and water-resistant materials may be selected for the outer layer 104.

In some embodiments, the inner layer 106 may comprise a hydrocarbon-impermeable material. For example, the inner layer 106 may comprise a polyester polyurethane material. The polyester polyurethane material may be selected to be hydrocarbon-impermeable. Other suitable materials may comprise, for example, polycaprolactone polyurethane, plasticized polyvinyl chloride, polyvinylidene chloride, polyamide, polyester polymers, including thermoplastic copolyester elastomers, polysulphide polymers, acrylonitrile polymers and copolymers, including acrylonitrile-butadiene polymers and styrene-acrylonitrile copolymers, vinyl alcohol polymers and copolymers, particularly those with ethylene, polyacrylic acid and ester polymers and copolymers, polymethacrylic acid and ester polymers and copolymers, tetrafluoroethylene polymers and copolymers, particularly those with ethylene, polyvinylidene fluoride, chlorotrifluoroethylene polymers and copolymers, including poly(ethylene-chlorotrifluoroethylene) and poly(chlorotrifluoroethylene-vinylidenefluoride), perfluoroalkoxy polymers, fluorinated ethylene-propylene polymers, chlorinated polyethylene, chlorosulphonated polyethylene, acrylonitrile-butadiene copolymers, hydrogenated acrylonitrile-butadiene copolymers, halogenated isobutylene-isoprene copolymers, epichlorohydrin polymers and copolymers, and/or grafted block copolymers, to name just a few. Those skilled in the art will recognize that other hydrocarbon-impermeable materials may be selected for the inner layer 106.

In some embodiments, the material of the outer layer 104 and the material of the inner layer 106 may be selected to be complimentary materials. For example, in one embodiment, the outer layer 104 may comprise a polyether polyurethane material. The inner layer 106 may be selected to be a complimentary, hydrocarbon impermeable material such as, for example, a polyester polyurethane material. Those skilled in the art will recognize that the selection of either the outer layer 104 material and/or the inner layer material 106 may influence the selection of materials for one or more additional layers of the multilayer jacket 102.

In some embodiments, the multilayer jacket 102 may comprise one or more additional layers, such as, for example, an adhesive layer between the outer layer 104 and the inner layer 106. In some embodiments, the multilayer jacket 102 may comprise, for example, an outer wear-resistant and water-resistant layer, an adhesive layer, a hydrocarbon impermeable layer, a second adhesive layer, and an inner wear-resistant layer. The use of an inner wear-resistant layer may allow, for example, a fragile, but highly hydrocarbon-impermeable polymer to be used for the hydrocarbon impermeable layer.

Those skilled in the art will recognize that the multilayer jacket 102 may comprise any number of layers, including multiple hydrocarbon impermeable, wear-resistant, or water-resistant layers.

Figure 3:
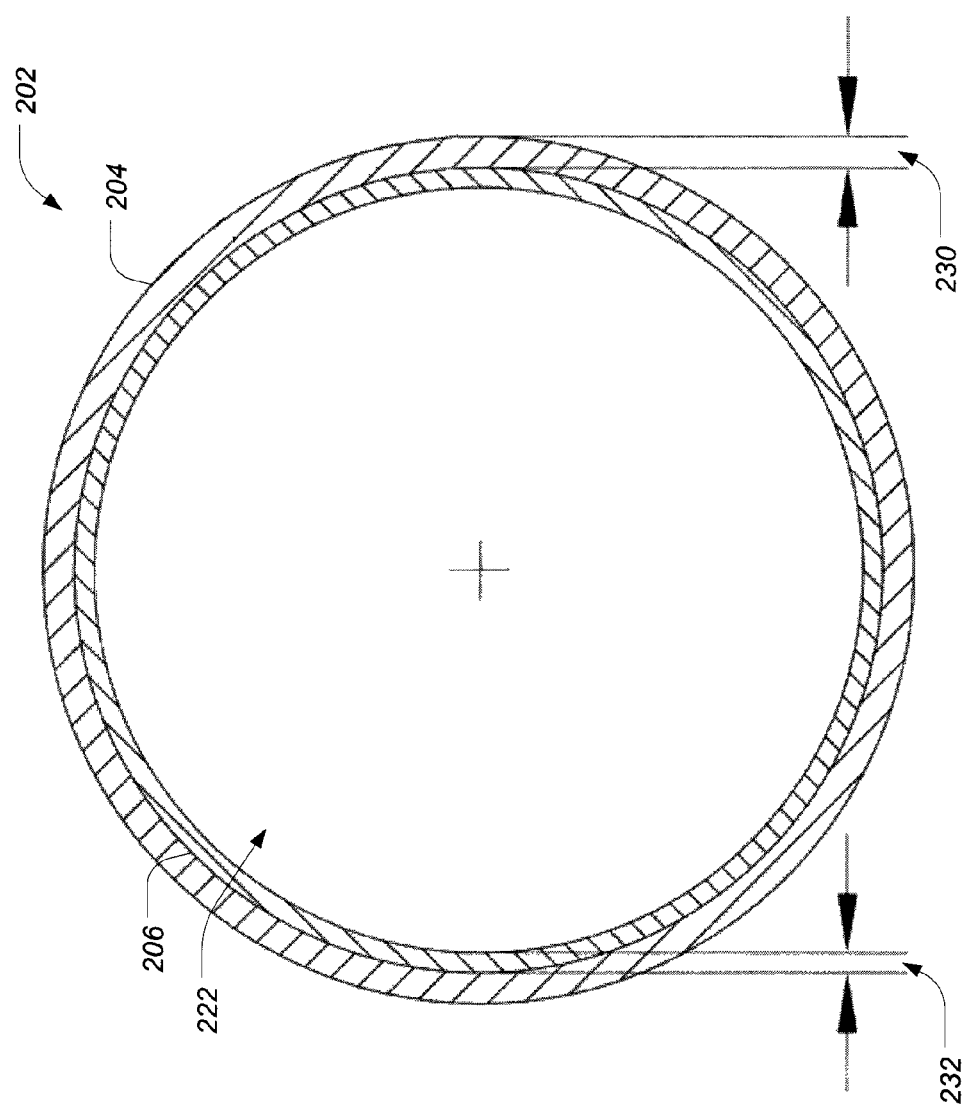
FIG. 3 illustrates one embodiment of a cross-sectional view of a multilayer jacket.

FIG. 3 illustrates a multilayer jacket 202 comprising an outer layer 204 and an inner layer 206. The outer layer 204 may comprise a wear-resistant and water-resistant material. The inner layer 206 may comprise a hydrocarbon impermeable material. The outer layer 204 and the inner layer 206 may be coupled by, for example, an adhesive layer (not shown) located between the outer layer 204 and the inner layer 206. In some embodiments, the outer layer 204 and the inner layer 206 may be formed by a co-extrusion process. A void-filler material may be inserted into an inner cavity 222 of the multilayer jacket 202. The void-filler material may comprise a low-density hydrocarbon-based void filler material, such as, for example, a low-density hydrocarbon fluid and/or a low-density liquid hydrocarbon-based solid. The outer layer 204 and the inner layer 206 may be selected to be complimentary. For example, in some embodiments, the type of material selected for the hydrocarbon impermeable inner layer 206 may depend on the type of material selected for the wear-resistant and water-resistant outer layer 204. For example, in one embodiment, the outer layer 204 may comprise a polyether polyurethane material and the inner layer 206 may comprise a polyester polyurethane material. In some embodiments, the outer layer 204 may comprise a first thickness 230 and the inner layer may comprise a second thickness 232. The first thickness 230 may be greater than, less than, or equal to the second thickness 232, for example, depending on the materials selected for the outer layer 204 and/or the inner layer 206.

Figure 4:
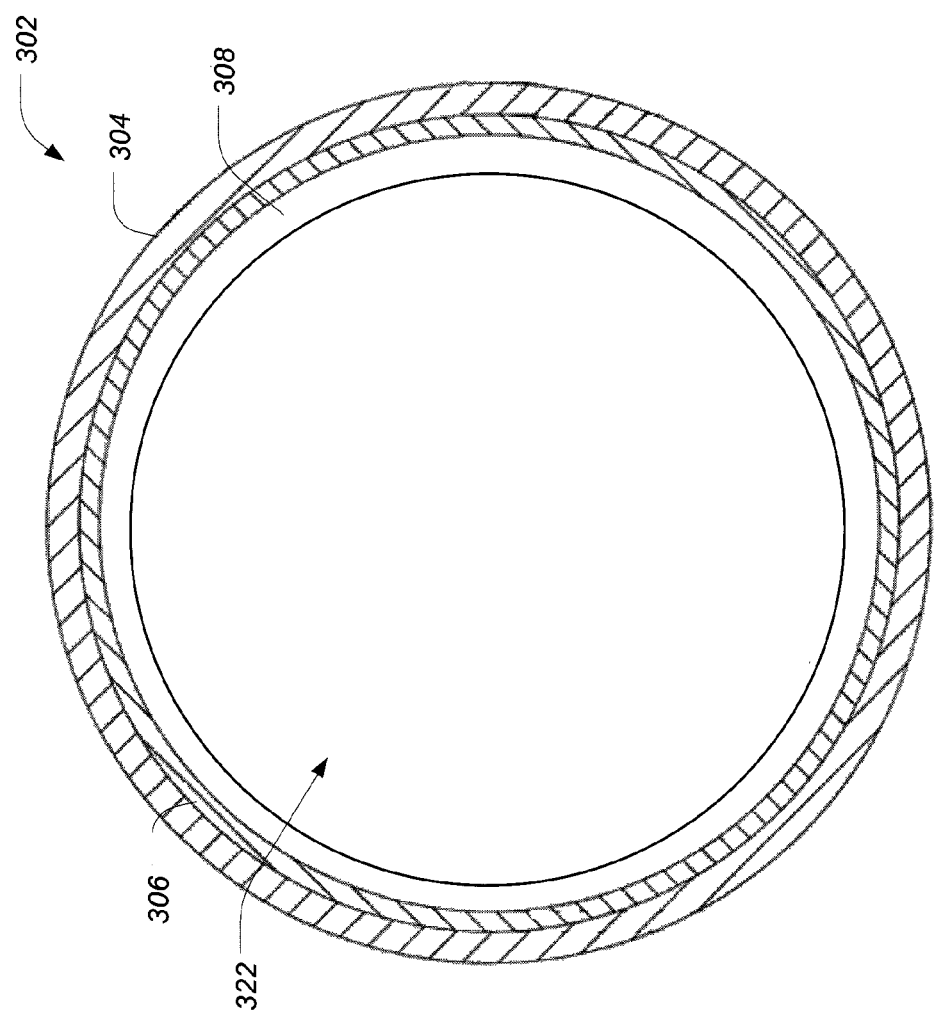
FIG. 4 illustrates one embodiment of a cross-section view of a multilayer jacket comprising an outer layer, a hydrocarbon impermeable layer, and an inner layer.

FIG. 4 illustrates one embodiment of a multilayer jacket 302 comprising a wear-resistant and water-resistant outer layer 304, a hydrocarbon impermeable layer 306, and a wear-resistant inner layer 308. The outer layer 304 may comprise a wear-resistant and water-resistant material. The hydrocarbon impermeable layer 306 may comprise a hydrocarbon resistant or impermeable material. The inner layer 308 may comprise a wear-resistant material. In some embodiments, the outer layer 304 and the inner layer 308 may comprise the same wear-resistant and water-resistant material. In some embodiments, the inner layer 308 may comprise a material different from the outer layer 304. The material of the outer layer 304, the hydrocarbon impermeable layer 306, and the inner layer 308 may be selected to be complimentary. For example, in some embodiments, the outer layer 304 and the inner layer 308 may comprise a polyether polyurethane material and the hydrocarbon impermeable layer 306 may comprise a polyester polyurethane material. Those skilled in the art will recognize that any number of complimentary materials may be selected for the outer layer 304, hydrocarbon impermeable 306, and/or the inner layer 308.

Figure 5:
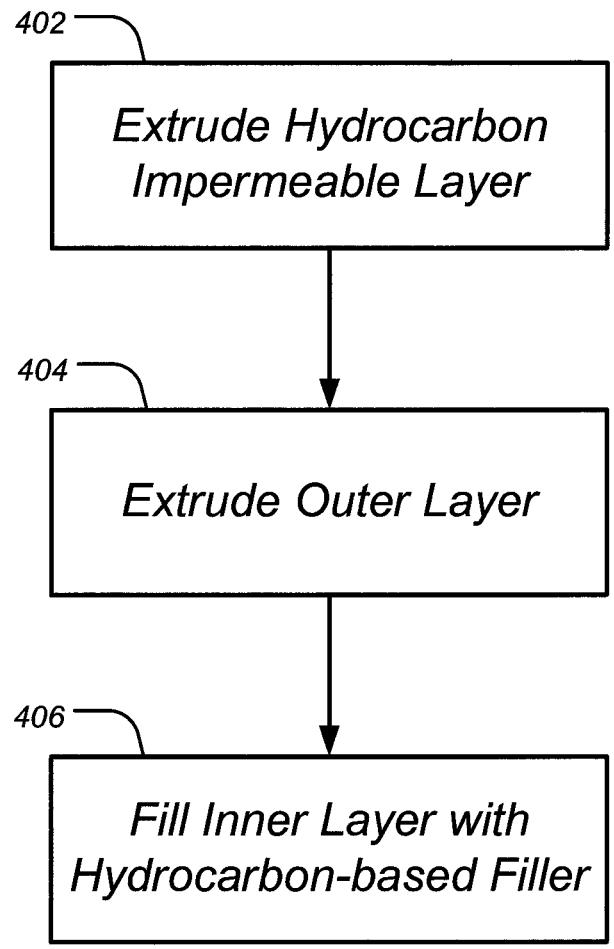
FIG. 5 illustrates one embodiment of a method for generating a multilayer jacket.

FIG. 5 illustrates one embodiment of a method for generating a multilayer jacket, such as, for example, the multilayer jackets shown in FIGS. 1-4. At step 402, a hydrocarbon impermeable layer may be extruded. At step 404, a wear-resistant and water-resistant outer layer may be extruded. In some embodiments, the hydrocarbon impermeable layer and the outer layer may be coextruded. In other embodiments, the hydrocarbon impermeable layer may be extruded first and the outer layer extruded second. The hydrocarbon impermeable layer and the outer layer may be bonded, for example, by an adhesive layer. The outer layer may comprise, for example, a polyether polyurethane material. The hydrocarbon impermeable layer may comprise, for example, a polyester polyurethane material. At step 406, the hydrocarbon-impermeable layer may be filled with a low-density hydrocarbon void-filler material. The low-density hydrocarbon void-filler material may comprise, for example, a low-density hydrocarbon fluid and/or a low-density liquid hydrocarbon-based solid.

While various details have been set forth in the foregoing description, it will be appreciated that the various aspects of the multilayer streamer jacket and methods for making the same may be practiced without these specific details. For example, for conciseness and clarity selected aspects have been shown in block diagram form rather than in detail. It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

It will be appreciated that those skilled in the art will be able to devise various arrangements which, although not explicitly described or shown herein, embody the principles of the present disclosure and are comprised within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein. Rather, the scope of present disclosure is embodied by the appended claims.

The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as when it was individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group may be comprised in, or deleted from, a group for reasons of convenience and/or patentability.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the disclosed embodiments.

Various aspects of the subject matter described herein are set out in the following numbered clauses:

1. A multilayer jacket for a seismic streamer comprising: an outer layer comprising a water-resistant and wear-resistant material; and an inner layer comprising a hydrocarbon impermeable material.

2. The multilayer jacket of clause 1, comprising a low density hydrocarbon void-filling material located within the inner layer.

3. The multilayer jacket of clause 2, wherein the low density hydrocarbon void-filling material comprises a low-density hydrocarbon fluid.

4. The multilayer jacket of clause 2, wherein the low density hydrocarbon void filling material comprises a low-density, liquid hydrocarbon based solid.

5. The multilayer jacket of clause 1, wherein the outer layer comprises a polyether polyurethane material.

6. The multilayer jacket of clause 5, wherein the inner layer comprises a polyester polyurethane material.

7. The multilayer jacket of clause 1, comprising a plurality of hydrophones disposed within the inner layer, the plurality of hydrophones configured to seismically image a section of seafloor.

8. The multilayer jacket of clause 1, wherein the outer layer and the inner layer are formed by co-extrusion.

9. The multilayer jacket of clause 1, comprising at least one additional inner layer.

10. A seismic streamer comprising: a jacket comprising a water-resistant and wear resistant material; a hydrocarbon impermeable material deposited on the inner surface of the jacket; and a low density hydrocarbon void-filling material located within the inner layer.

11. The seismic streamer of clause 10, comprising a plurality of hydrophones disposed within the jacket, the plurality of hydrophones configured to seismically image a section of seafloor.

12. The seismic streamer of clause 10, wherein the low density hydrocarbon void-filling material comprises a low-density hydrocarbon fluid.

13. The seismic streamer of clause 10, wherein the low density hydrocarbon void-filling material comprises a low-density liquid hydrocarbon based solid.

14. The seismic streamer of clause 10, wherein the jacket comprises a polyether polyurethane material.

15. The seismic streamer of clause 14, wherein the hydrocarbon impermeable material comprises a polyester polyurethane material.

16. The seismic streamer of clause 10, wherein the jacket and the hydrocarbon impermeable material are formed by co-extrusion.

17. A method of generating a multilayer jacket for a seismic streamer, the method comprising: extruding an inner layer comprising a hydrocarbon impermeable material; extruding an outer layer comprising a water-resistant and wear-resistant material; and filling the inner layer with a low-density hydrocarbon void-filling material.

18. The method of clause 17, comprising extruding the inner layer comprising a polyester polyurethane material.

19. The method of clause 18, comprising extruding the outer layer comprising a polyether polyurethane material.

20. The method of clause 17, comprising filling the inner layer with the low-density hydrocarbon void-filling material comprising a low-density hydrocarbon fluid.

21. The method of clause 17, comprising filling the inner layer with the low-density hydrocarbon void-filling material comprising a low-density liquid hydrocarbon based solid.

What is claimed is:

1. A multilayer jacket for a seismic streamer comprising:
   an outer layer comprising a water-resistant and wear-resistant material;
   a middle layer comprising a hydrocarbon impermeable material;
   an inner layer comprising a wear-resistant material, wherein the middle layer is disposed between the outer layer and the inner layer; and
   a low density hydrocarbon void-filling material located within the inner layer, wherein a buoyancy of the multilayer jacket may be adjusted by selecting low density hydrocarbon void-filling material having various densities.

2. The multilayer jacket of claim 1, wherein the low density hydrocarbon void-filling material comprises a low-density hydrocarbon fluid.

3. The multilayer jacket of claim 1, wherein the low density hydrocarbon void filling material comprises a low-density, liquid hydrocarbon based solid.

4. The multilayer jacket of claim 1, wherein the outer layer comprises a polyether polyurethane material.

5. The multilayer jacket of claim 4, wherein the inner layer comprises a polyester polyurethane material.

6. The multilayer jacket of claim 1, comprising a plurality of hydrophones disposed within the inner layer, the plurality of hydrophones configured to seismically image a section of seafloor.

7. The multilayer jacket of claim 1, wherein the outer layer and the inner layer are formed by co-extrusion.

8. A seismic streamer comprising:
   a jacket comprising a water-resistant and wear resistant material;
   a hydrocarbon impermeable material deposited on the inner surface of the jacket;
   a wear-resistant material deposited on the hydrocarbon impermeable material; and
   a low density hydrocarbon void-filling material located within the inner layer, wherein a buoyancy of the seismic streamer may be adjusted by selecting low density hydrocarbon void-filling material having various densities.

9. The seismic streamer of claim 8, comprising a plurality of hydrophones disposed within the jacket, the plurality of hydrophones configured to seismically image a section of seafloor.

10. The seismic streamer of claim 8, wherein the low density hydrocarbon void-filling material comprises a low-density hydrocarbon fluid.

11. The seismic streamer of claim 8, wherein the low density hydrocarbon void-filling material comprises a low-density liquid hydrocarbon based solid.

12. The seismic streamer of claim 8, wherein the jacket comprises a polyether polyurethane material.

13. The seismic streamer of claim 12, wherein the hydrocarbon impermeable material comprises a polyester polyurethane material.

14. The seismic streamer of claim 8, wherein the jacket and the hydrocarbon impermeable material are formed by co-extrusion.

15. A method of generating a multilayer jacket for a seismic streamer, the method comprising:
   extruding an inner layer comprising a wear-resistant material;
   extruding a middle layer comprising a hydrocarbon impermeable material;
   extruding an outer layer comprising a water-resistant and wear-resistant material, wherein the middle layer is disposed between the outer layer and the inner layer,
   wherein a buoyancy of the seismic streamer may be adjusted by selecting low density hydrocarbon void-filling material having various densities; and
   filling the inner layer with a low-density hydrocarbon void-filling material.

16. The method of claim 15, comprising extruding the middle layer comprising a polyester polyurethane material.

17. The method of claim 16, comprising extruding the outer layer comprising a polyether polyurethane material.

18. The method of claim 15, comprising filling the inner layer with the low-density hydrocarbon void-filling material comprising a low-density hydrocarbon fluid.

19. The method of claim 15, comprising filling the inner layer with the low-density hydrocarbon void-filling material comprising a low-density liquid hydrocarbon based solid.

* * * * *